March 24, 1959 T. MILLER 2,879,325
COLOR TELEVISION PICTURE TUBE AND ASSOCIATED CIRCUIT
Filed June 26, 1952 2 Sheets-Sheet 1

WITNESSES:
E. A. McCloskey.
Leon M. Garman

INVENTOR
Theadore Miller.
BY
F. E. Browder
ATTORNEY

COLOR TELEVISION PICTURE TUBE AND ASSOCIATED CIRCUIT

Filed June 26, 1952 2 Sheets-Sheet 2

WITNESSES:
E. A. McCloskey
Leon M. Garman

INVENTOR
Theadore Miller.
BY
F. E. Browder
ATTORNEY 2,879,325

COLOR TELEVISION PICTURE TUBE AND ASSOCIATED CIRCUIT

Theadore Miller, South Gate, Calif., assignor to Westinghouse Electric Corporation, East Pittsburgh, Pa., a corporation of Pennsylvania Application June 26, 1952, Serial No. 295,675

8 Claims. (Cl. 178—5.4)

My invention relates to color television systems and in particular relates to a picture-receiving tube of a new and more practicable type for color television systems in which signals representing three primary colors are transmitted in such rapid succession that they are practically simultaneous.

The color television systems most used commercially today separate the modulations or signals which represent the three primary colors of red, green and blue by sending them in rather slow sequence, one color at a time. Under certain picture-conditions color reproduction is not perfect, and so systems in which the three color-signals are sent simultaneously or practically simultaneously have been proposed. The picture-receiving circuits proposed have however been extremely complex and the picture-tubes have required such things as screen-masks and triple-barrel electron guns which are extremely difficult to produce.

One object of my invention is to provide a new and improved color television system capable of operating with color signals which are practically simultaneously transmitted.

Another object of my invention is to provide a color television picture-receiving tube in which a scanning-beam from a single electron-gun is capable of responding to three color signals which are, for practical purposes simultaneously transmitted.

Still another object of my invention is to provide a color television picture-receiving tube in which extremely fine focussing of the scanning-beam is not required.

Yet another object of my invention is to provide a new and improved picture-receiving tube for color television systems of the "by-passed monochrome" type.

Other objects of my invention will become apparent upon reading the following description taken in connection with the drawings in which.

Figure 1:
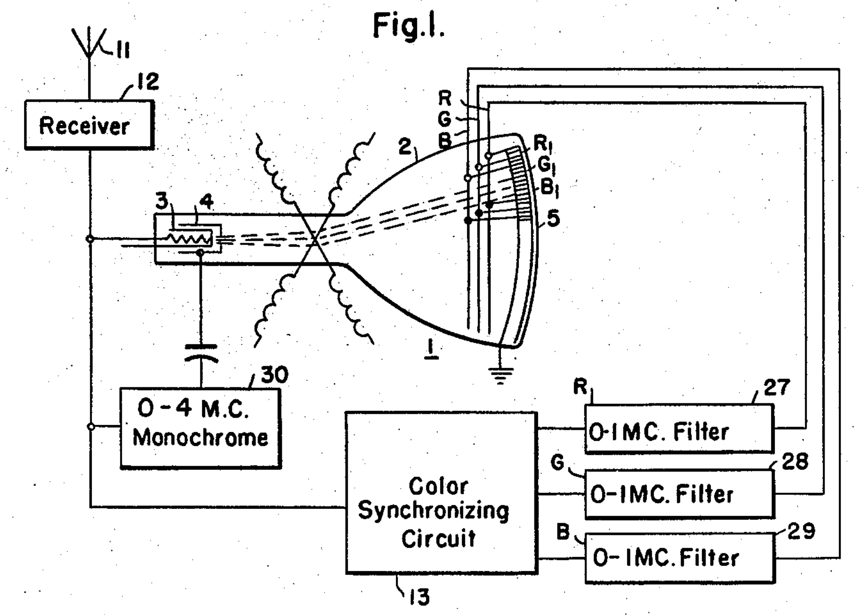
Figure 1 is a schematic view of a picture-receiving tube and control-circuits therefor embodying the principles of my invention.

Referring in detail to the drawings, the picture receiving tube 1 comprises a vacuum tight container 2 of conventional outline having an electron-gun 3 of usual type with a control electrode 4 which may be modulated with a broadcast picture signal. At the opposite end of the tube is a glass screen 5 which the electron-beam from the electron-gun 3 is caused by deflection-coils to scan in the usual fashion in a series of parallel transverse paths starting each frame at the top of the picture-raster and ending it at the bottom. If the incoming picture-signal is suitably modulated in ways well known in the television art the screen 5 may be subjected to interlaced scanning if desired. In front of the screen 5 and in the path of the beam from the electron-gun 3 is a color-control electrode 6 which is shown in more detail in Fig. 2. The electrode 6 has three terminals R, G and B on which are respectively impressed the red, green and blue color-signals coming in from the television transmitter. The electrode 6 also has a fourth terminal C which is connected to ground.

To give one typical mode of utilizing my invention, I will describe its use with what is known as a "by-passed monochrome" or "mixed highs" transmission, one description of which appears in an article "Mixed Highs In Color Television" by A. V. Bedford, Proceedings of the Institute of Radio Engineers, vol. 38, pp. 1003 to 1009. Thus the signal coming into the antenna 11 in Fig. 1 is demodulated in receiver 12 producing an output band of about 0–4 mc. which is impressed on the control electrode 4 of receiver-tube 1 and on a color synchronizing circuit 13. At the transmitter a synchronous switch is arranged to modulate a carrier wave during the first 120 degrees of its cycle in accordance with an image of the red light in the picture, during the second 120 degrees with the green-light image of the picture, and during the final 120 degrees with the blue-light image of the picture. The resulting signal, freed of the carrier and of modulations above 4 mc., is impressed on the control grid 4 of tube 1; and a portion of it is passed through a switch in color synchronizing circuit 13, which is synchronized with that at the transmitter. This switch impresses the signal during the first 120 degrees of its cycle on the terminal R of electrode 6. During the second 120 degrees of the switch-cycle the demodulated output from receiver 12 is impressed on terminal G of electrode 6, and during the final 120 degrees of the switch cycle the output from receiver 12 is impressed on terminal B of electrode 6.

Figure 2:
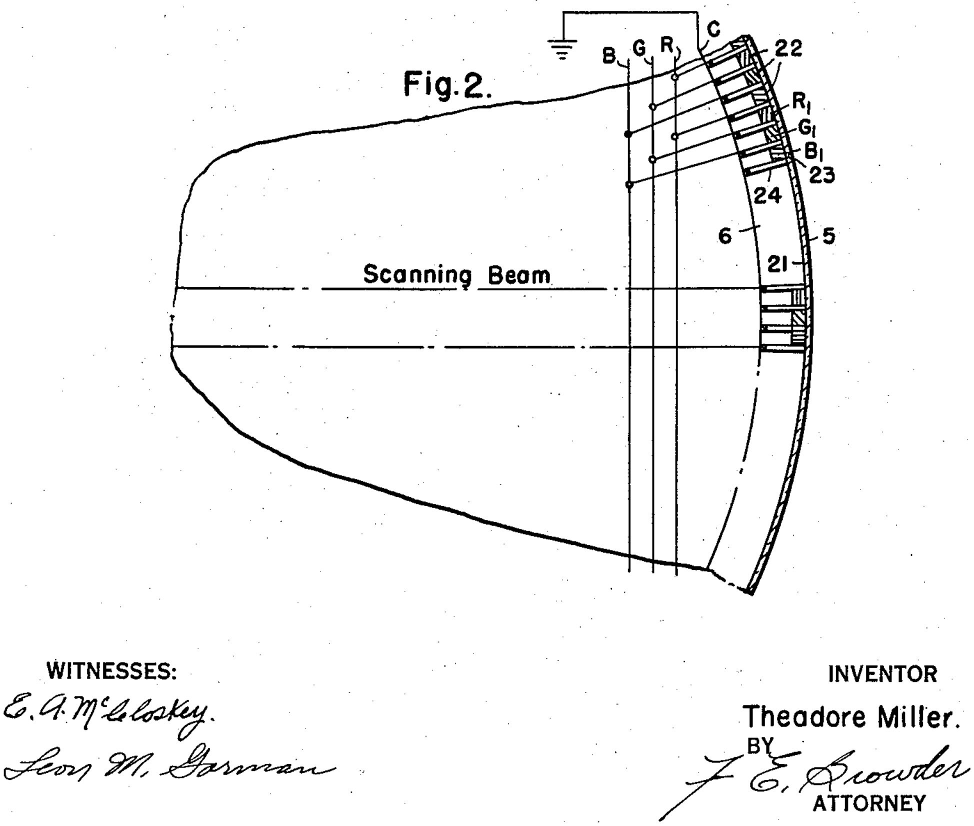
Fig. 2 is a schematic illustration in enlarged detail section of the picture screen and electrodes for color-modulating the scanning beam of Fig. 1.

The screen 5 and electrode 6 are shown in more detail in Fig. 2. Screen 5 consists of a transparent layer 21 on which are supported parallel strips 22 of phosphor subdivided into groups of three red-emitting $R_1$, green-emitting $G_1$, and blue-emitting $B_1$. There may for most purposes suitably be a total of around 1500 such strips running horizontally on a picture about 14 inches high.

The control electrode 6 consists of thin conductive plates 23, 24 having one edge embedded in the glass wall of screen 5, one on each side of the joints between the $R_1$, $G_1$ and $B_1$ phosphor strips and plates 23, 24 standing substantially normal to the screen 5. The plates 23, 24 may be about 1 cm. wide in their direction normal to screen 5. The plates 23 at the red phosphor strips $R_1$ are all connected to the terminal R of electrode 6; the plates 23 at strips $G_1$ are all connected to the terminal G of electrode 6; and the plates 23 at strips $B_1$ are all connected to terminal B of electrode 6. The plates 24 are all connected together to the terminal C of electrode 6. It will be seen that each of the regions in front of the phosphor strip lies between a pair of plates 23, 24 which can impress an electric field in said space, and that the terminal R of electrode 6 can control the electric field in front of all the $R_1$ phosphors, the terminal G on electrode 6 can fix the electric field before all the $G_1$ phosphors, and the B terminal on electrode 6 can fix the electric field before all the $B_1$ phosphors.

The scanning-beam is focussed to span the $R_1$, $G_1$ and $B_1$ phosphors constituting a group so that, were no electric fields impressed between any of the plates 23, 24 all three colors would be emitted at the point where the beam strikes screen 5; i.e., a white light would be emitted.

However, the color synchronizing circuit 13 is arranged to bias the terminals R, G and B of electrode 6 to a negative potential except when one of them is impressed with an incoming signal by its synchronized switch. An incoming red signal thus, for example, is impressed by said switch on the R terminal and thus sets up a positive electric potential before all the $R_1$ phosphors sufficient to permit the electrons in the scanning beam to strike the portion of the latter at which the beam is pointed at that moment, but the electric field, impressed by the color synchronizing circuit 13 in front of the $G_1$ and $B_1$ phosphor strips is sufficient to repel the electrons of the scanning beam so that none of those phosphors are stimulated to emission. Thus for a moment a spot on the screen 5 excites red light in amount corresponding to the intensity of the red-light picture signal coming in.

During the second 120 degrees of the switch-cycle, synchronizing circuit 13 impresses the green-light signal from the transmitter on the region in front of all the $G_1$ phosphors, but repels all electrons from the $R_1$ and $B_1$ phosphors. Thus the scanning beam stimulates a green-light phosphor to emission, but is unable to reach any red-light phosphor $R_1$, or blue light phosphor $B_1$. Similarly during the final 120 degrees of the switching cycle the synchronizing circuit 13 controls the electric field before the blue-emitting phosphors $B_1$ so the scanning beam can reach them, but produces a repellent electric field before the red-emitting and green-emitting phosphors which prevents their being stimulated to luminosity. As the scanning beam moves across the screen it thus excites red, green, and blue light in proper intensity point-by-point, until the entire picture has been painted.

As is shown by the above-mentioned Bedford article, satisfactory color pictures are obtained if the modulation-frequencies for the respective colors are limited to 1 mc. provided a band of 3 or 4 mc. is provided for modulations of the picture regardless of color. The capacitance inherent in plates 23, 24 is large enough to draw charging currents of awkward size if modulations of 4 mc. are impressed upon them, and to minimize difficulty from this source it is advisable to supply filters 27, 28, 29 of band-limits 0 to 1 mc. ahead of the terminals R, G and B of electrode 6 since color effects will still be satisfactory when operating within the 0 to 1 mc. band-limits while the charging currents in plates 23, 24 will be reduced. On the other hand the supply of the full 0 to 4 mc. band, through filter 30, without distinction as to color, modulates the scanning-beam with the monochrome detail just mentioned above as desirable. Thus while the receiver tube of Fig. 1 will be entirely operative where three continuous color-modulations of a transmission system which is of the type not utilizing the above "mixed highs" principle, there is a particular advantage in the combination of my tube with a mixed-high transmission.

In Fig. 2, I have shown a picture tube in which the screen 5 and color-control electrode 6 are of curved configuration; and this form was shown in order that the plates 23, 24 might be parallel to the direction of the scanning-beam at the upper and lower borders of the raster. It might however be better for optical reasons and easier to manufacture the electrode 6 structure if the screen 5 were a plane surface, and my invention may utilize such a screen in the tube shown in Fig. 3.

Figure 3:
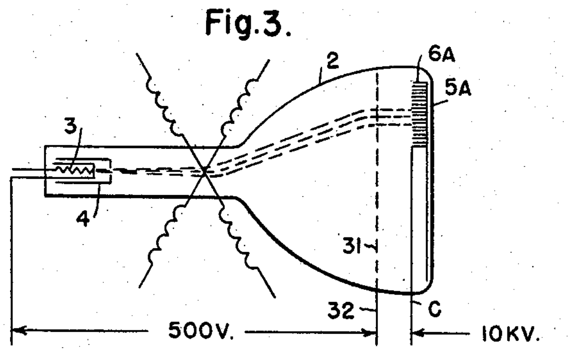
Fig. 3 is a schematic view of an alternative form of picture tube to that shown in Fig. 1.

In Fig. 3 the screen 5A and color-control electrode 6A are the same as screen 5 and color-control electrode 6 in Fig. 1 except that the screen 5A is plane and the plates 23, 24 on the latter are normal to that plane. At a suitable distance, e.g. two or three inches, in front of the color-control electrode 6A a coarse-mesh screen 31 of very fine wire (e.g. 2 mil wire) is positioned parallel to screen 5A and provided with an in-lead 32 by which its potential may be fixed at a value about 500 volts positive relative to cathode 3, and possible ten kilovolts negative relative to the terminal C of color-control electrode 6A. This arrangement will insure that the electrons of the scanning beam move parallel to the axis of tube 2 when nearing color-control electrode 6A.

In the "mixed highs" transmissions with which I am familiar the video signal coming in is proportional to the sum of the intensity of the color signal arriving at any moment and to the picture intensity irrespective of color, i.e. of the monochromatic picture intensity. Hence to properly reproduce pictures from such signals any receiver should produce a scanning-beam intensity at the phosphor proportional to the sum of the signal impressed on grid 4 and the signal impressed at any moment on color-control electrode 6. On the other hand the tubes I have described above produce a beam intensity proportional to the product of the monochrome signal impressed on grid 4 and the color signal impressed on the color-control electrode.

The above-described situation may be analysed mathematically as follows:

Let $Y'$=monochrome signal $R-Y$=red chromaticity signal, frequency limited to one megacycle $G-Y$=green chromaticity signal, frequency limited to one megacycle $B-Y$=blue chromaticity signal, frequency limited to one megacycle For purpose of illustration consider only the red channel. It is desirable to make the system function so as to produce a red signal intensity defined as $$I_R=Y'+R-Y \qquad (1)$$

In the picture tubes shown in Figs. 1 and 3, the phosphor excitation is proportional to the product of the signal applied to the control grid of the electron gun and to the signal applied to the color deflecting plates 23, 24. Consequently, it may be necessary to process the color signals so as to produce correct signal information. Let W be the signal applied to the deflecting plates 23, 24 associated with the red phosphor strips. The red phosphor excitation will be given by $$I_R=(Y').(K_1-K_2W) \qquad (2)$$

The quantity $(K_1-K_2W)$ represents the control characteristic of the deflection plates. If W can be made equal to $$A+\frac{R-Y}{Y'}$$

the phosphor excitation will become $$I_R=Y'\left[K_1-K_2\left(A+\frac{R-Y}{Y'}\right)\right]=Y'(K_1-K_2A)+(R-Y) \qquad (3)$$

$(K_1-K_2A)$ represents a constant biasing signal which is adjusted so that, with zero chromaticity, signal $I_R$ equals Y'. With this adjustment $(K_1-K_2A)$ equals unity and $$I_R=Y'+(R-Y) \qquad (4)$$

Since this is identical with Equation 1, correct color signals will be produced.

Figure 4:
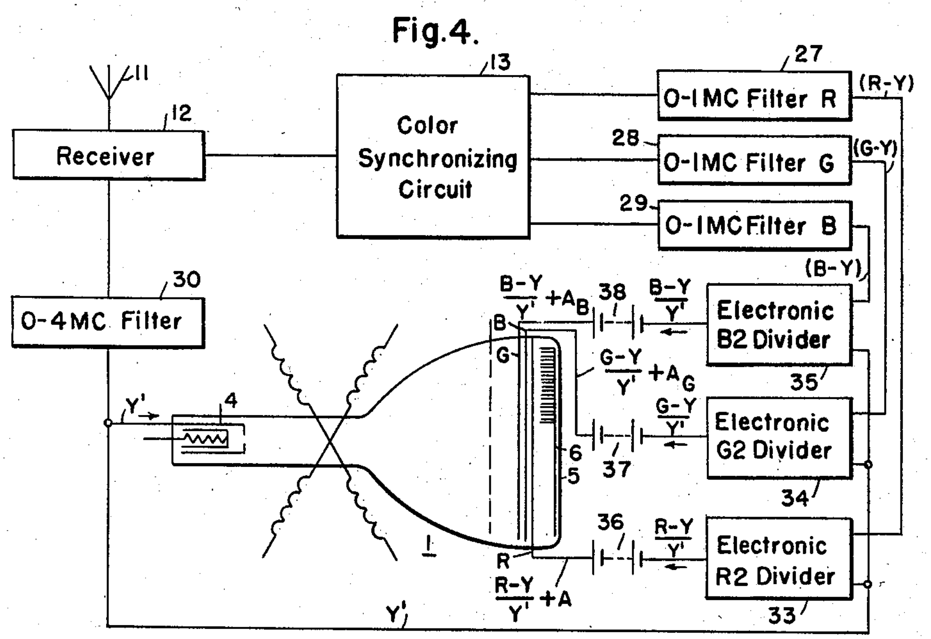
Fig. 4 is a schematic representation of a tube and circuit which are an alternative to those of Fig. 1.

Figure 4 illustrates schematically one method for obtaining the necessary modification of the chromaticity signals. The monochrome signal is divided into two paths; one signal path modulates the control grid of the electron gun in the usual fashion and the other signal path is applied to an electronic divider which produces an output signal equal to the quotient of the chromaticity signal by the monochrome signal.

Fig. 4 shows an arrangement of circuits which will produce a signal W impressed on the color-control electrodes $R_1$, $G_1$, $B_1$, which will fulfill the above-required conditions that $$\overline{W}=\left(A+\frac{R-Y}{Y'}\right)$$

and $K_1-K_2A=1$. Thus the output from signal-receiver 12 is transmitted through color-synchronizing circuit 13 and 0–1 mc. filters 27, 28, and 29 on the output of which there appears respectively the red chromaticity signal $R-Y$, the green chromaticity signal $G-Y$, and the blue chromaticity signal $B-Y$. This receiver 12 output is also sent through filter 30 furnishing the signal Y' to the grid 4 of picture tube 1. This signal Y' is likewise impressed on three networks 33, 34, 35. On another input terminal of each is respectively impressed the outputs of filters 27, 28 and 29. The networks 33, 34 and 35 are electronic dividers such for example as the divider shown at Section 3–12 of the MIT Radiation Laboratories book "Electronic Instruments" published by McGraw-Hill Publishing Co., New York, and have the property that their output voltage is proportional to the quotient of the voltages impressed on their input terminals. Hence the output terminals of divider 33 have a voltage proportional to $$\frac{R-Y}{Y'}$$

those of divider 34 a voltage proportional to $$\frac{G-Y}{Y'}$$

and those of divider 35 a voltage proportional to $$\frac{B-Y}{Y'}$$

The output of divider 33 is connected to terminal R of deflection electrode 6 through a voltage source 36 of value AR; hence the voltage impressed on that terminal is $$\overline{W}=A_r-\frac{R-Y}{Y'}$$

and the excitation of the red-emitting phosphor strip by the scanning-beam is, per equation.

$$I_r=(K_{1r}-K_{2r}A_r)+R-Y \qquad (5)$$

$K_{1r}$ and $K_{2r}$ are constants which express the variation of scanning-beam stimulation of the red phosphor with voltage applied between plates 33, 34 and may be found experimentally for any given tube; but, whatever their values may be, the voltage source 36 may be adjusted to such a value that $K_{1r}-K_{2r}A_r=1$; and, this being done, $I_r=Y'+R-Y$ and, as stated above, the incoming signals will reproduce on screen 5 a correct picture of the red image at the transmitter. Similarly the voltage sources 37 and 38 positioned between the outputs of dividers 34 and 35 may be adjusted to values which meet the above conditions for the green and blue color transmissions and give true pictures on the output screen 5 of the green and blue pictures at the transmitter.

A rectangular cross-section would be desirable for the electron beam at its incidence with target 5 to minimize the effects of slight displacements from true registry with the phosphor strips $R_1$, $G_1$, $B_1$.

While the picture tubes of Figs. 1 and 4 have been described in use on a "mixed highs" or simultaneous system of color-signal transmission, it is usable also on any of the color-sequential transmissions, whether frame-sequential, line-sequential or sub-line sequential.

I claim as my invention:

1. In combination with a container having an end-wall coated with parallel strips of fluorescent material said strips being divided into groups of adjacent strips which respectively emit light of different colors, a pair of conductive plates lining opposite edges of each strip and substantially normal thereto, a common lead connected to one plate of all said pairs and the other of said plates being connected to leads common to all strips of the same color, an electron-gun projecting a scanning beam onto said strips, and means for deflecting said beam so that its trace moves along said strips substantially parallel with their longest dimension.

2. In combination with a container having an end-wall coated with parallel strips of fluorescent material, said strips being divided into groups of adjacent strips which respectively emit light of different colors, a pair of conductive plates lining opposite edges of each strip and substantially normal thereto, a common lead connected to one plate of all said pairs and the other of said plates being connected to leads common to all strips of the same color, an electron-gun projecting a scanning beam onto said strips, and means for deflecting said beam so that its trace moves along said strips substantially parallel with their longest dimension, the width of said scanning beam at said plates being substantially the same as the width of one said group.

3. In combination with a container having a substantially plane end-wall at one end and a neck-portion at the other end, an electron-gun projecting a scanning beam from said neck-portion into incidence with said end-wall, means in the region of said neck-portion for deflecting said scanning beam to cause its end to traverse parallel paths across said end-wall, strips of fluorescent material supported on said end-wall and lying parallel to said paths, said strips being divided into groups of adjacent strips which emit light of different colors, a pair of conductive plates normal to said end wall and lining opposite edges of each said strip, a common lead connected to one plate of all said pairs and the others of said plates being connected to the leads common to all strips of the same color, and a screen-electrode parallel to said end-wall and positioned between it and said neck-portion and provided with an in-lead for fixing its potential.

4. In combination with a container having a substantially plane end-wall at one end and a neck-portion at the other end, an electron-gun projecting a scanning beam from said neck-portion into incidence with said end wall, means in the region of said neck-portion for deflecting said scanning beam to cause its end to traverse parallel paths across said end-wall, strips of fluorescent material supported on said end-wall and lying parallel to said paths, said strips being divided into groups of three adjacent strips which respectively emit red, green and blue light, a pair of conductive plates normal to said end wall and lining opposite edges of each said strip, a common lead connected to one plate of all said pairs and the others of said plates being connected to leads common to all strips of the same color, and a screen-electrode parallel to said end-wall and positioned between it and said neck-portion and provided with an in-lead for fixing its potential.

5. In combination with an electrical discharge tube embodying a scanning-beam and a screen on which said beam is incident, said screen comprising groups of adjacent strips of differently-emitting materials, a first control voltage source and means for impressing it on a control electrode for said scanning beam, a second control voltage source, circuit means to derive a third control voltage proportional to a constant plus the quotient of said second control voltage divided by said first control voltage, and means to produce in front of said strips an electric field which is proportional to said third control voltage.

6. In combination with an electrical discharge tube embodying a scanning-beam and a screen on which said beam is incident, said screen comprising groups of adjacent strips of fluorescent materials, the strips of each group emitting lights of different colors, a first control voltage source and means for impressing it on a control electrode for said scanning beam, a second control voltage source, circuit means to derive a third control voltage proportional to a constant plus the quotient of said second control voltage divided by said first control voltage, and means to porduce in front of said strips an electric field which is proportional to said third control voltage.

7. In combination with an electrical discharge tube embodying an electron gun and a screen on which a scanning beam from said gun is incident, said screen comprising groups of adjacent strips of differently-emitting materials, a pair of conductive plates normal to each said strip and lining the opposite edges thereof, a first source of control voltage and means for impressing it on a control electrode of said electron gun, a second source of control voltage, circuit means to derive a third control voltage which is proportional to a constant plus the quotient of said second control voltage divided by said first control voltage, and means to impress said third control voltage between the two plates of said pairs.

8. In combination with an electrical discharge tube embodying an electron gun and a screen on which a scanning beam from said gun is incident, said screen comprising groups of adjacent strips of fluorescent materials, the strips of each group emitting lights of different colors, a pair of conductive plates normal to said strip and lining the opposite edges thereof, a first source of control voltage and means for impressing it on a control electrode of said electron gun, a second source of control voltage, circuit means to derive a third control voltage which is proportional to a constant plus the quotient of said second control voltage divided by said first control voltage, and means to impress said third control voltage between the two plates of said pairs.

References Cited in the file of this patent

UNITED STATES PATENTS

| | | |
|---|---|---|
| 2,090,952 | Schlesinger | Aug. 24, 1937 |
| 2,150,159 | Gray | Mar. 14, 1939 |
| 2,315,367 | Epstein | Mar. 30, 1943 |
| 2,446,249 | Schroeder | Aug. 3, 1948 |
| 2,446,440 | Swedlund | Aug. 3, 1948 |
| 2,498,705 | Parker | Feb. 28, 1950 |
| 2,532,511 | Okolicsanyi | Dec. 5, 1950 |
| 2,577,368 | Schultz et al. | Dec. 4, 1951 |
| 2,617,876 | Rose | Nov. 11, 1952 |
| 2,660,684 | Parker | Nov. 24, 1953 |
| 2,692,532 | Lawrence | Oct. 26, 1954 |